US012662036B2

(12) United States Patent
Yoshida et al.

(10) Patent No.: US 12,662,036 B2
(45) Date of Patent: Jun. 23, 2026

(54) SEAT FOR VEHICLE

(71) Applicants: TACHI-S CO., LTD., Akishima (JP);
Mie University, Tsu (JP)

(72) Inventors: Masami Yoshida, Akishima (JP);
Takumi Yamakawa, Akishima (JP);
Soichiro Hayakawa, Tsu (JP); Ryojun Ikeura, Tsu (JP)

(73) Assignees: TACHI-S CO., LTD., Akishima (JP);
Mie University, Tsu (JP)

( * ) Notice: Subject to any disclaimer, the term of this patent is extended or adjusted under 35 U.S.C. 154(b) by 621 days.

(21) Appl. No.: 17/877,868

(22) Filed: Jul. 29, 2022

(65) Prior Publication Data

US 2023/0115012 A1 Apr. 13, 2023

(30) Foreign Application Priority Data

Oct. 8, 2021 (JP) ................................. 2021-166518

(51) Int. Cl.
*B60N 2/90* (2018.01)
*A61H 23/02* (2006.01)
(52) U.S. Cl.
CPC ............... *B60N 2/90* (2018.02); *A61H 23/02* (2013.01)
(58) Field of Classification Search
CPC ........... B60N 2/90; B60N 2/665; A61H 23/02
USPC ...................................................... 297/284.4
See application file for complete search history.

(56) References Cited

U.S. PATENT DOCUMENTS

| | | | | |
|---|---|---|---|---|
| 5,263,765 A | * | 11/1993 | Nagashima | ............ B60N 2/914 297/284.6 |
| 5,455,494 A | * | 10/1995 | Ogasawara | ............ B60N 2/666 297/DIG. 3 |
| 2009/0127906 A1 | | 5/2009 | Sugiyama | |
| 2013/0062921 A1 | | 3/2013 | Meyer et al. | |
| 2014/0217792 A1 | | 8/2014 | Meyer | |

FOREIGN PATENT DOCUMENTS

| | | |
|---|---|---|
| JP | H05-317138 A | 12/1993 |
| JP | 2006-198307 A | 8/2006 |
| JP | 2017-510502 A | 4/2017 |

(Continued)

OTHER PUBLICATIONS

Office Action issued Feb. 12, 2025, in Japanese Patent Application No. 2021-166518.

*Primary Examiner* — Anthony D Barfield
(74) *Attorney, Agent, or Firm* — Potomac Law Group, PLLC

(57) ABSTRACT

There is provided a technique by which posture changing can be given to an occupant while the forward shift of his/her hip portion is prevented. A seat for vehicle includes a seat cushion, and a seat back coupled to the seat cushion, and the seat back includes a posture changing mechanism having a back face supporting mechanism. There is provided a technique by which a fatigue reduction operation using the posture changing mechanism includes a) moving the back face supporting mechanism set to a position of a lumbar spine portion of an occupant from a first position state to a rear direction side and setting the back face supporting mechanism to a second position state, and b) thereafter, moving the back face supporting mechanism stepwise to a front direction side from the second position state to the first position state.

8 Claims, 13 Drawing Sheets

(56)     References Cited

FOREIGN PATENT DOCUMENTS

| JP | 2018507766 | A | * | 3/2018 | ............ B60N 2/665 |
| WO | 2007/094492 | A1 | | 8/2007 | |
| WO | 2015/157481 | A1 | | 10/2015 | |

* cited by examiner

F I G . 2
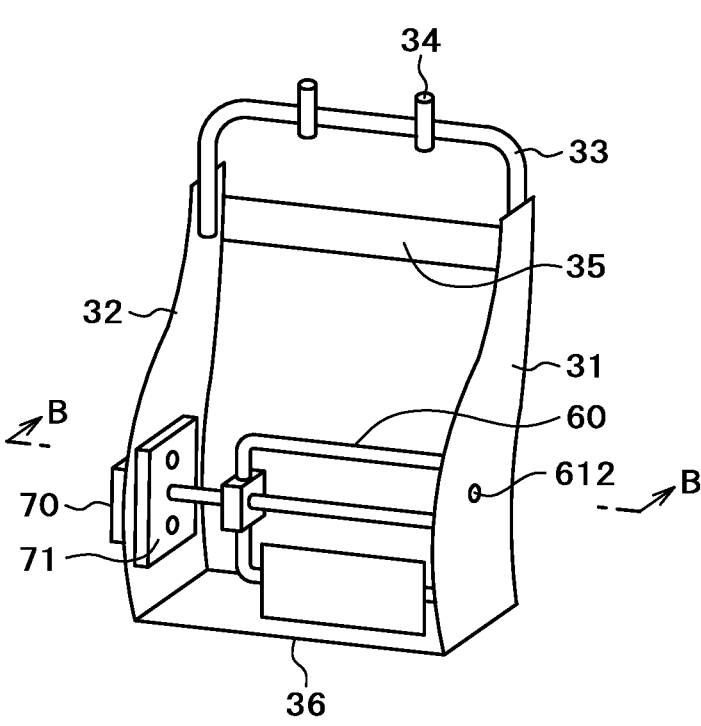

F I G . 3
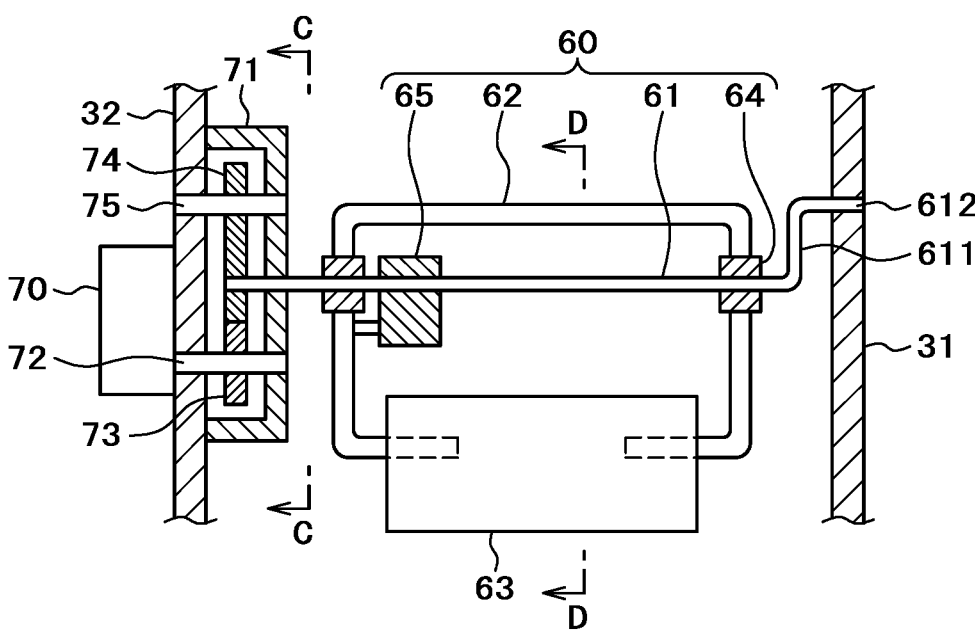

F I G . 7
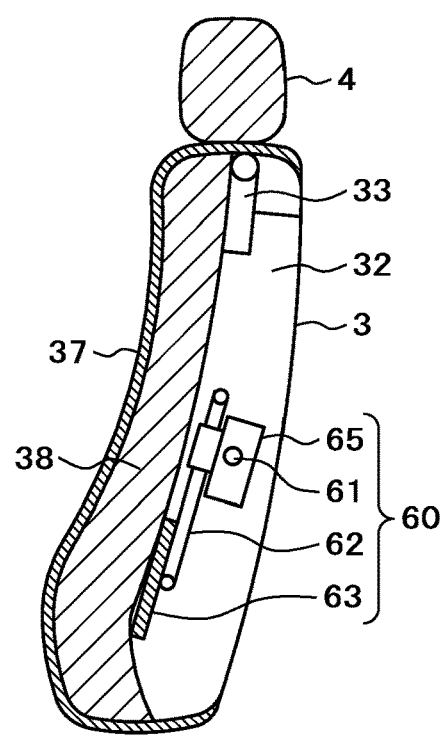
F I G . 8
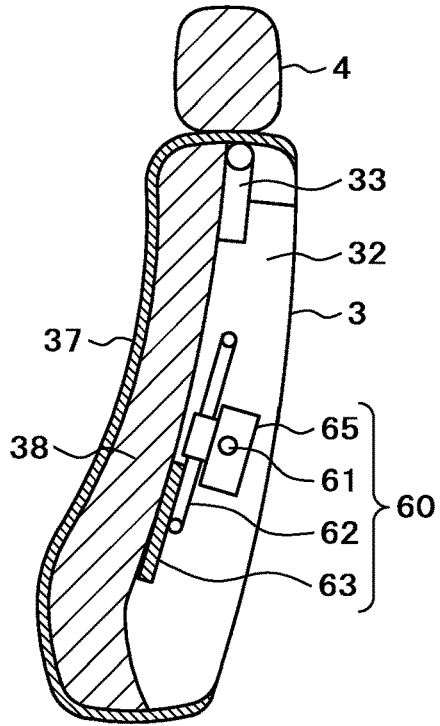

F I G . 9
100
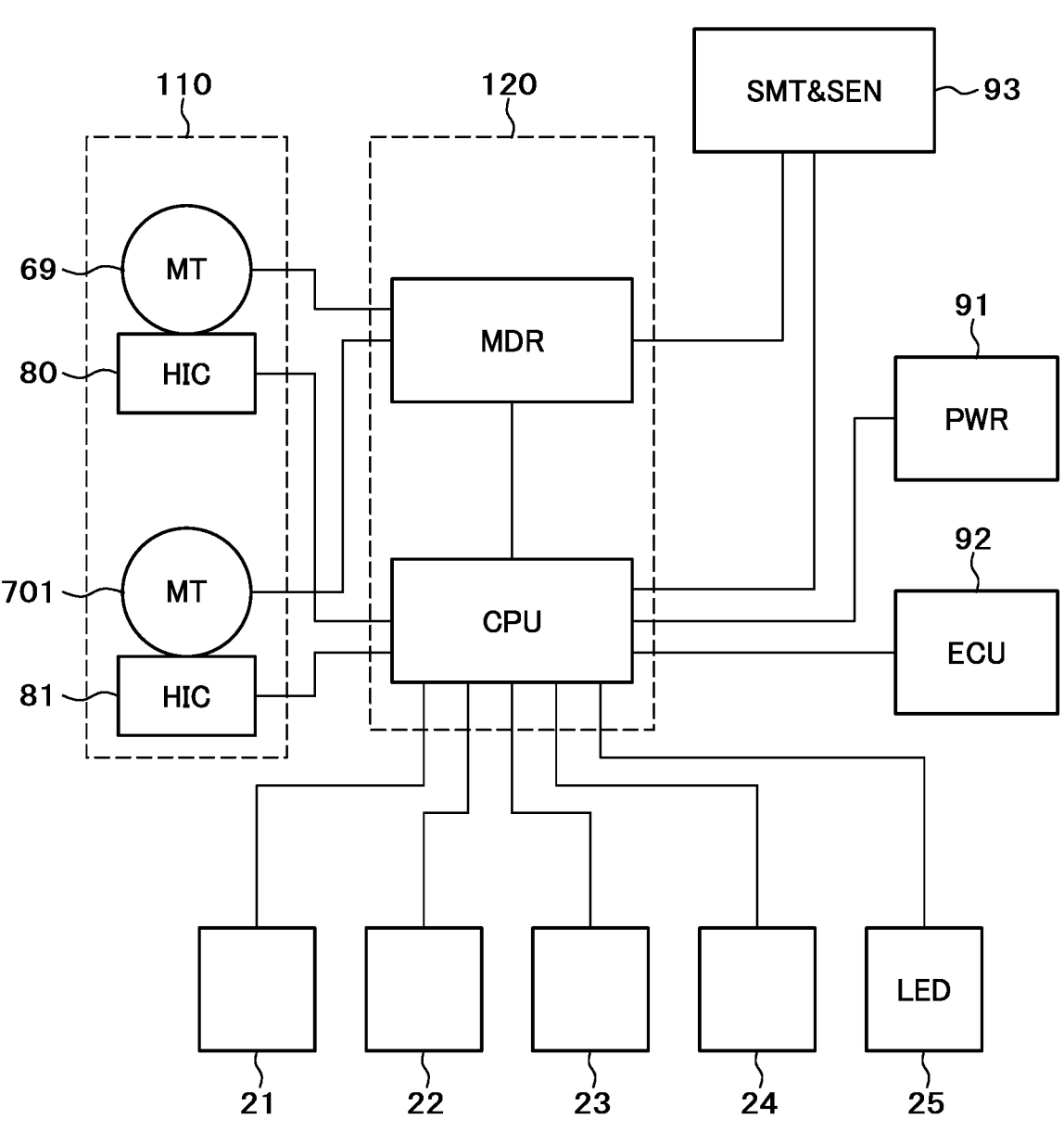

F I G . 1 1
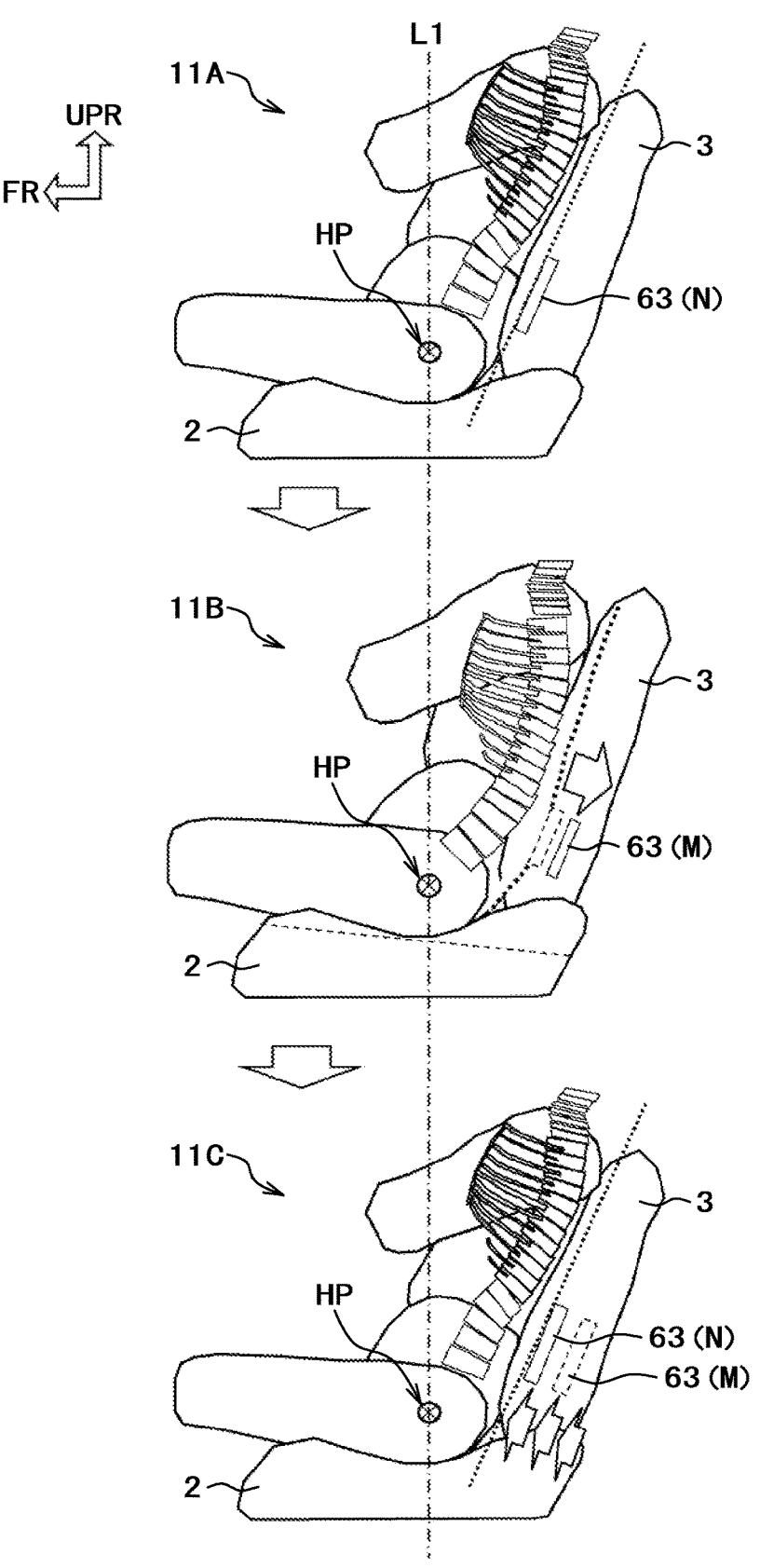

F I G . 1 5
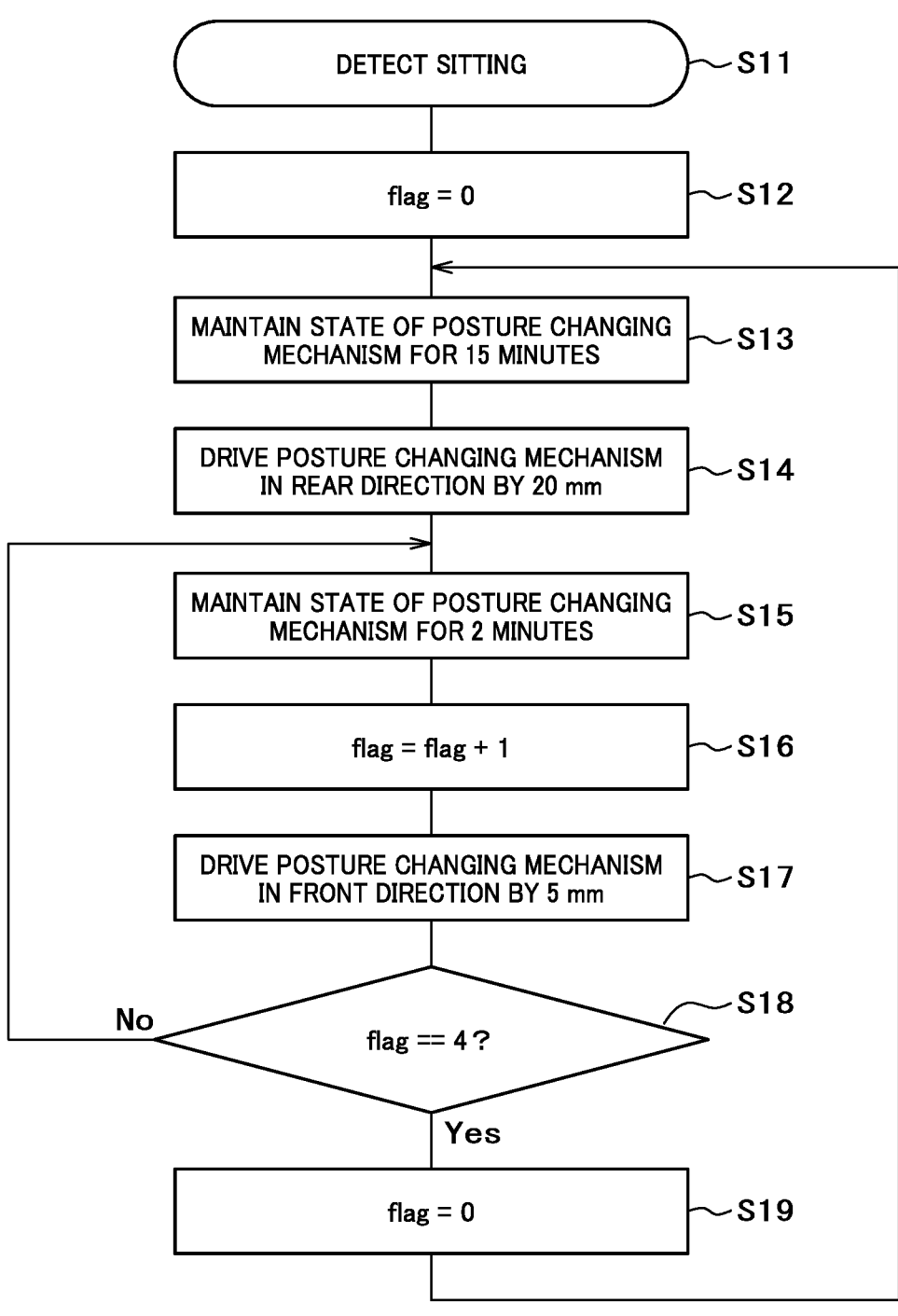

SEAT FOR VEHICLE

CLAIM OF PRIORITY

The present application claims priority from Japanese Patent Application JP 2021-166518 filed on Oct. 8, 2021, the content of which is hereby incorporated by reference into this application.

BACKGROUND OF THE INVENTION

The present disclosure relates to a seat for vehicle. More specifically, the present disclosure relates to a technique effective for being applied to a seat for vehicle having a massage function.

As the proposition of the seat for vehicle having a massage function, for example, there is Japanese Patent Application JP 2006-198307.

SUMMARY OF THE INVENTION

The present disclosers have studied a technique by which a posture changing mechanism provided in the seat for vehicle is periodically operated, thereby reducing fatigue accumulation to an occupant due to long-hour driving.

The study by the present disclosers has found that when the supporting operation in the front-rear direction of the posture changing mechanism is repeated at the hip portion of the occupant, movement to the front direction (hereinafter, referred to as "forward shift") of the hip portion of the occupant occurs on the seat cushion even if the occupant wears the seat belt, and the forward shift gradually becomes larger. When the forward shift of the hip portion occurs, the fatigue accumulation reduction effect for the occupant may not be sufficiently obtained.

An object of the present invention is to provide a technique by which posture changing can be given to an occupant while the forward shift of his/her hip portion is prevented.

Other objects and novel features will be apparent from the description of this specification and the accompanying drawings.

The overview of the representative invention of the present invention will be briefly described as follows.

According to one embodiment, a seat for vehicle includes a seat cushion, and a seat back coupled to the seat cushion, and the seat back includes a posture changing mechanism having a back face supporting mechanism. There is provided a technique by which a fatigue reduction operation using the posture changing mechanism includes a) moving the back face supporting mechanism set to a position of a lumbar spine portion of an occupant from a first position state to a rear direction side and setting the back face supporting mechanism to a second position state, and b) thereafter, moving the back face supporting mechanism stepwise to a front direction side from the second position state to the first position state.

That is, the back face supporting mechanism of the posture changing mechanism is retreated in the rear direction to the set position (the second position state), and thereafter, the back face supporting mechanism is moved in the front direction at time intervals by a constant amount to the neutral state (the first position state) of the back face supporting mechanism. Then, this operation is repeatedly executed.

According to the seat for vehicle, the posture changing can be given to the occupant while the forward shift of his/her hip portion is prevented, thereby enabling to reduce the fatigue of the occupant.

BRIEF DESCRIPTION OF THE DRAWINGS

FIG. 2 is a perspective view of the seat back frame of the seat for vehicle according to the example;

FIG. 3 is a diagram illustrating the configuration example of a lumbar support section, a driving section, and a driving transmission section of FIG. 2;

FIG. 7 is a diagram illustrating a state where a resin plate 63 pushes out a urethane pad 38 to the front on the down side;

FIG. 8 is a diagram illustrating a state where the resin plate 63 pushes out the urethane pad 38 to the front on the up side;

FIG. 9 is a block diagram explaining an example of the circuit configuration of a control system according to the example;

FIG. 11 is a diagram explaining the operation of a first posture changing mode according to the example;

FIG. 15 is a diagram of the operation flow of the first posture changing mode according to the example.

DETAILED DESCRIPTION OF THE PREFERRED EMBODIMENTS

Figure 1:
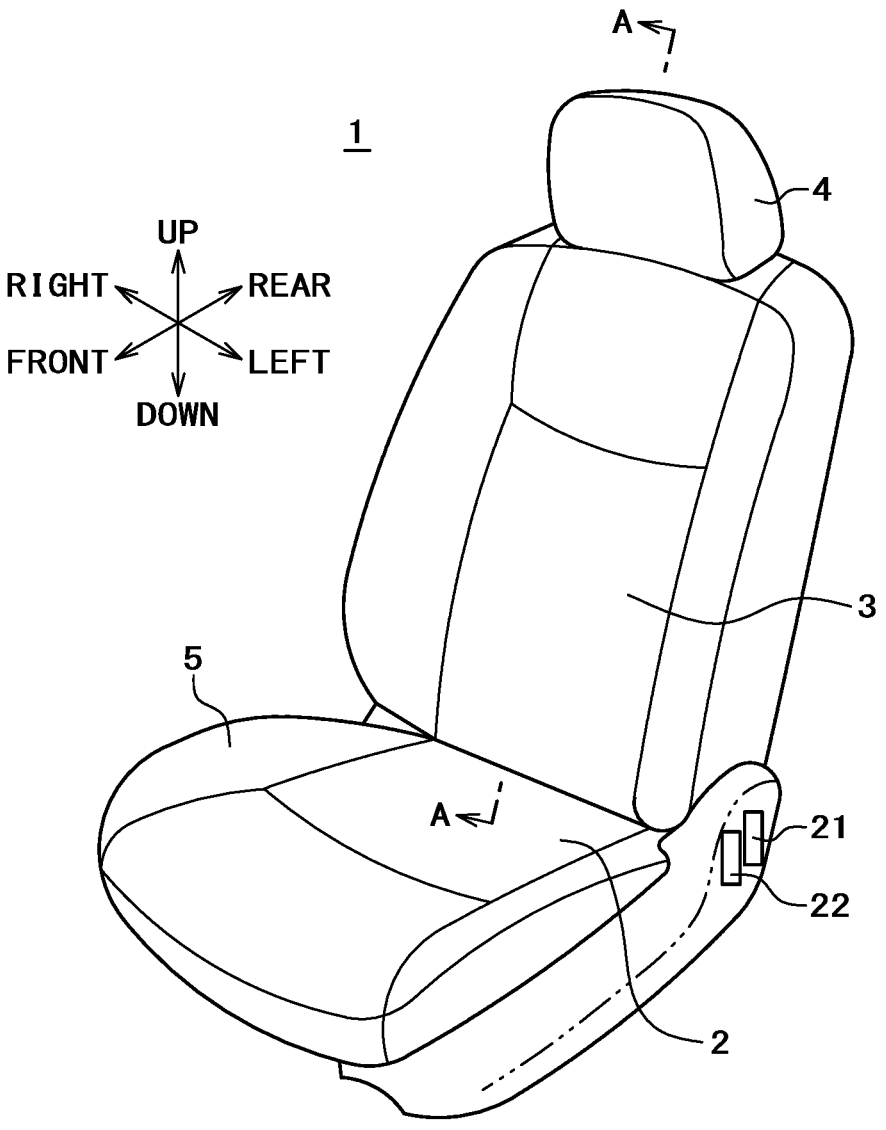
FIG. 1 is a perspective view of a seat for vehicle according to an example.

An embodiment of the present invention will be described below with reference to the drawings.

Note that the present disclosure is only an example, and to make the description clearer, the drawings can be schematically expressed for the width, thickness, shape, and the like of each section as compared with the actual form, which does not limit the construe of the present invention. Also, in this specification and the respective drawings, the same elements as the previously described elements in relation to the previous drawings are indicated by the same reference numerals and the detailed description may be omitted, as needed. Also, in the drawings, the front arrow indicates the front side of a vehicle, the rear arrow indicates the rear side of the vehicle, the left arrow indicates the left side of the vehicle, the right arrow indicates the right side of the vehicle, the up arrow indicates the up side of the vehicle, and the down arrow indicates the down side of the vehicle. Also, unless otherwise specified, the front, rear, up, down, left, and right in the following description mean the front, rear, up, down, left, and right with respect to the vehicle.

Example

FIG. 1 is a perspective view illustrating a seat for vehicle according to an example.

A seat for vehicle 1 includes a seat cushion 2 on which an occupant sits, a seat back 3 on which the occupant sitting on the seat cushion 2 leans his/her back, a head rest 4 that supports the head portion of the occupant, and side supports 5. The seat back 3 is tiltably coupled to the seat cushion 2 by a reclining mechanism. The reference numeral 21 provided on the side face of the seat cushion 2 is a front-rear direction adjusting switch that adjusts the position in the front-rear direction of a lumbar support section 60 described later, and the reference numeral 22 is an up-down direction adjusting switch that adjusts the position in the up-down direction of the lumbar support section 60.

FIG. 2 illustrates a perspective view of a seat back frame in a state where members, such as a seat cover and a urethane pad, on the front side (the face on the side with which the back of the sitting occupant comes into contact) of the seat back 3 are removed. The reference numeral 31 is a left back side frame, and the reference numeral 32 is a right back side frame. The reference numeral 33 is an upper portion back side frame, the reference numeral 35 is an upper panel, the reference numeral 36 is a lower panel, and each of them is connected to the left back side frame 31 and the right back side frame 32. The reference numeral 34 is supporting sections that support a pair of stays extending from the head rest 4, the supporting sections being fixed to the upper portion back side frame 33 by welding.

The reference numeral 60 is the lumbar support section, the reference numeral 70 is the driving section of the lumbar support section, and the reference numeral 71 is a driving transmission section. Also, the reference numeral 612 is the end of a shaft configuring the lumbar support section 60.

FIG. 3 is a diagram corresponding to an enlarged view seen in the B-B direction of FIG. 2 and illustrating the configuration example of the lumbar support section 60, the driving section 70 of the lumbar support section, and the driving transmission section 71. The driving section 70 is configured of an electric motor (the reference numeral 701 of FIG. 9) to which a head gear is mounted, and is fixed to the right back side frame 32. The reference numeral 72 is the output shaft of the driving section 70, and a driving section gear 73 is fixed in the interior of the driving transmission section 71.

The reference numeral 74 is a sector gear, and engages with the driving section gear 73. The sector gear 74 is turnably supported by the right back side frame 32 and the driving transmission section 71 at a shaft 75. The driving section 70 swings the sector gear 74 by rotating the driving section gear 73 fixed to the output shaft 72 forward and rearward. The end of a wire A61 configuring the lumbar support section 60 is fixed to the portion of the sector gear 74 away from the shaft 75 (an eccentric portion).

Figure 4:
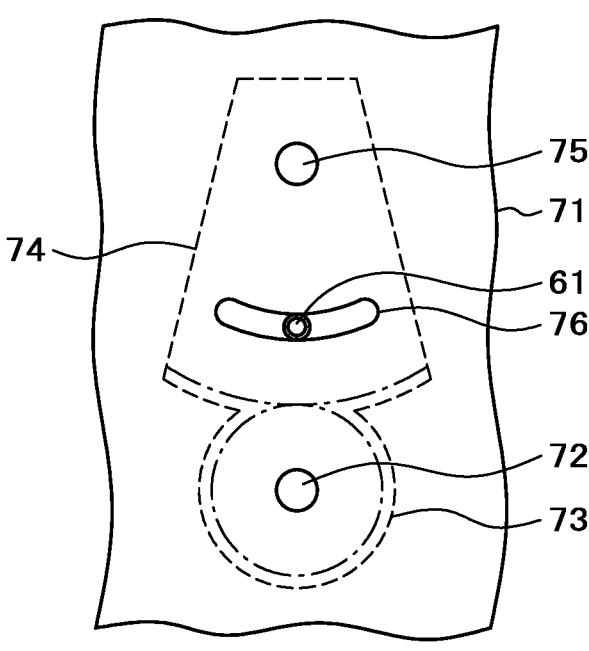
FIG. 4 is a plan view explaining the driving transmission section.

FIG. 4 is a plan view corresponding to an enlarged view seen in the C-C direction of FIG. 3 and explaining the driving transmission section 71. The sector gear 74 and the driving section gear 73 are in an engaged state. The sector gear 74 has a shape in which a portion thereof is cut away while the portion of a circular gear necessary for the engagement with the driving section gear 73 is left. Each of the output shaft 72 of the motor to which the driving section gear 73 is fixed and the shaft 75 to which the sector gear 74 is mounted is turnably supported by the driving transmission section 71.

In the driving transmission section 71, a groove 76 for guiding the wire A61 eccentrically fixed to the sector gear 74 is formed. The groove 76 is formed in a shape matching a track in which the wire A61 swings with respect to the shaft 75 supporting the sector gear 74.

Returning to FIG. 3, the lumbar support section 60 includes the wire A61, a wire B62 supported at two left and right portions thereof by blocks 64 with respect to the wire A61, a resin plate 63 fixed to the wire B62, and an up-down driving section 65 fixed to the wire A61 and driving the wire B62 in the up-down direction. The blocks 64 are fixed to the wire A61 and swingably support the wire B62.

The end on the left side of the wire A61 is fixed to the sector gear 74 through the groove 76 formed in the driving transmission section 71. The vicinity of the end on the right side of the wire A61 is once bent at a portion indicated by the reference numeral 611, and the end 612 of the portion bent again is turnably supported by the left-side back side frame 31. The end 612 is formed so that its center axis coincides with the center axis of the shaft 75 supporting the sector gear 74.

By configuring the lumbar support section 60 in this way, the front-rear direction adjusting switch 21 provided on the side portion of the seat cushion 2 is operated to drive the driving section 70 and the output shaft 72 is turned by a certain angle, so that the sector gear 74 is turned about the shaft 75 by the driving section gear 73 fixed to the output shaft 72. By the turning of the sector gear 74, the wire A61 fixed at its end to the sector gear 74 swings along the groove 76 formed in the driving transmission section 71 about the shaft 75 of the sector gear 74.

By the swinging of the wire A61 along the groove 76, the resin plate 63 fixed to the wire B62 swings about the shaft 75 of the sector gear 74 and the position in the front-rear direction (in FIG. 3, the direction perpendicular to the sheet surface) of the resin plate 63 is changed. With this, the pressing amount to the back of the sitting occupant through the member (for example, the urethane pad covered by the seat cover) on the front side (the face on the side with which the back of the occupant sitting on the seat for vehicle 1 comes into contact) of the seat back 3 is changed, so that the pressing force can be increased or decreased.

Here, the wire B62 is configured to be guided by the pair of blocks 64 fixed to the wire A61, be driven by the up-down driving section 65, and be movable in the up-down direction (in FIG. 3, in the up-down direction) with respect to the wire A61. By moving the wire B62 up and down with respect to the wire A61, the position in the up-down direction of the resin plate 63 can be changed. With this, the position pressing the back of the sitting occupant through the member (for example, the urethane pad covered by the seat cover) on the front side (the face on the side with which the back of the occupant sitting on the seat for vehicle 1 comes into contact) of the seat back 3 can be adjusted in the up-down direction (the height direction).

Figure 5:
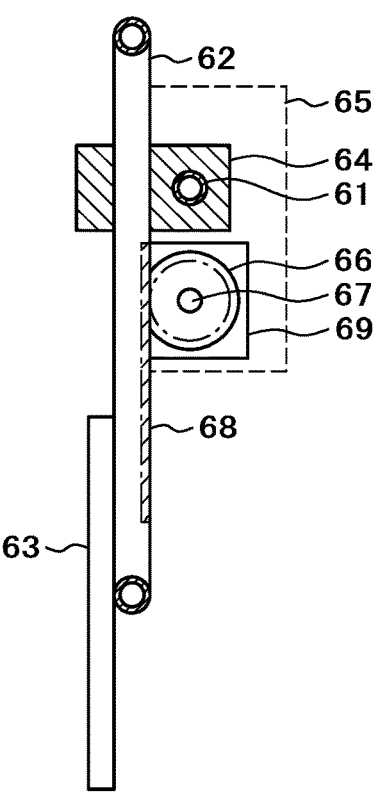
FIG. 5 is a diagram illustrating a state where a wire B62 is slid to the down side with respect to a wire A61 and is held.
Figure 6:
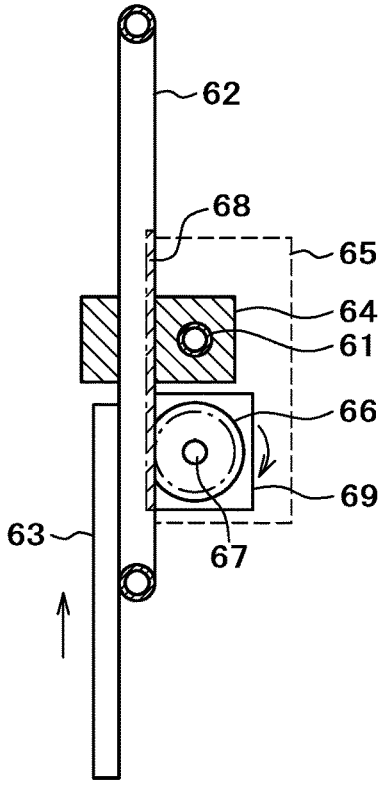
FIG. 6 is a diagram illustrating a state where the wire B62 is slid to the up side with respect to the wire A61 and is held.

FIGS. 5 and 6 each correspond to a cross-sectional view when the seat for vehicle 1 of FIG. 1 is seen in the A-A direction. FIG. 5 is a diagram illustrating a state where the wire B62 is slid to the down side with respect to the wire A61 and is held. FIG. 6 is a diagram illustrating a state where the wire B62 is slid to the up side with respect to the wire A61 and is held. In FIGS. 5 and 6, the wire B62 is slidably held in the up-down direction by the blocks 64 fixed to the wire A61. Also, the up-down driving section 65 that drives the wire B62 in the up-down direction is mounted to the wire A61. In the up-down driving section 65, a gear 66 is fixed and mounted to an output shaft 67 of a motor 69 with speed reducer. On the other hand, in the wire B62, a spur gear 68 engaging with the gear 66 is formed, and the gear 66 and the spur gear 68 configure a rack and pinion.

By allowing the wire A61 and the wire B62 to have such a configuration, so that the up-down direction adjusting switch 22 provided on the side portion of the seat cushion 2 is operated to drive the motor 69 with speed reducer of the up-down driving section 65 fixed to the side of the wire A61 and the gear 66 is rotated in the arrow direction of FIG. 6, and thus, the wire B62 is guided by the blocks 64 fixed to the wire A61, and is moved up with respect to the wire A61. Also, by rotating the motor 69 with speed reducer reversely, the wire B62 is lowered with respect to the wire A61, and the position relationship between the wire A61 and the wire B62 can be changed from the state of FIG. 6 to the state of FIG. 5.

FIG. 7 is a diagram illustrating a state where the resin plate 63 pushes out the urethane pad 38 to the front on the down side. FIG. 8 is a diagram illustrating a state where the resin plate 63 pushes out the urethane pad 38 to the front on the up side. FIG. 7 is a pushout state where the resin plate 63 is positioned on the down side, protrudes to the front, and pushes out the urethane pad 38 to the front, and the lumbar support section 60 corresponds to the state as illustrated in FIG. 5. In this state, the waist portion of the occupant sitting on the seat for vehicle 1 is pushed through the urethane pad 38 and the seat cover 37.

On the other hand, FIG. 8 is a pushout state where the resin plate 63 is positioned on the up side as compared with the state of FIG. 7, protrudes to the front, and pushes out the urethane pad 38 to the front, and the lumbar support section 60 corresponds to the state as illustrated in FIG. 6. In this state, the portion upper than the waist portion of the occupant sitting on the seat for vehicle 1 is pushed through the urethane pad 38 and the seat cover 37.

For the position in the height direction (the up-down direction) and the position in the front-rear direction of the resin plate 63, the position in the height direction and the position in the front-rear direction can be adjusted by operating the front-rear direction adjusting switch 21 and the up-down direction adjusting switch 22, respectively.

In the present invention, by using the seat for vehicle 1 described in FIGS. 1 to 8, a fatigue reduction effect is given to the occupant. In the following description, a posture changing mechanism 110 is configured of, for example, the lumbar support section 60, the driving section 70, and the driving transmission section 71. Also, the back face supporting mechanism (63) corresponds to, for example, the resin plate 63, the support changing mechanism (65) corresponds to, for example, the up-down driving section 65 that incorporates the motor 69, and the pushout amount adjusting motor (701) corresponds to, for example, the electric motor incorporated in the driving section 70.

FIG. 9 is a block diagram explaining an example of the circuit configuration of a control system according to the example. A control system 100 has the function of a fatigue reduction system that gives the fatigue reduction effect to the occupant.

The control system 100 is provided in the seat for vehicle 1, and includes the posture changing mechanism 110, a control section 120 that controls the operation of the posture changing mechanism 110, and a plurality of switches 21, 22, 23, 24, and the like connected to the control section 120.

The posture changing mechanism 110 includes the motor (MT) 69 that can move the back face supporting mechanism 63 in the up-down direction, and the pushout amount adjusting motor 701 that can move the back face supporting mechanism 63 in the front-rear direction. The posture changing mechanism 110 further includes a hall IC (HIC) 80 as a sensor that detects the operation amount, such as the number of rotations, of the motor 69, and a hall IC (HIC) 81 as a sensor that detects the operation amount, such as the number of rotations, of the pushout amount adjusting motor (MT) 701. The motor 69 with speed reducer can also be referred to as a first motor, and the pushout amount adjusting motor (MT) 701 can also be referred to as a second motor. The hall IC (HIC) 80 can be referred to as a first hall IC, and the hall IC (HIC) 81 can be referred to as a second hall IC.

The control section 120 is a seat ECU (electronic control unit), and includes a motor driver MDR that drives the motors 69, 701, and a central processing unit CPU. The motor driver MDR is electrically connected to the motors 69, 701 by a harness. The motor driver MDR performs the rotation control of each of the motors 69, 701 by using PWM (pulse width modulation) on the basis of the control from the central processing unit CPU. The central processing unit CPU is a collective term for a data processing device that incorporates the central processing unit, receives the data (value) of the number of rotations of each of the motors 69, 701 detected or measured by the HICs 80, 81, and stores the data in the memory circuit incorporated in the central processing unit CPU. The central processing unit CPU executes data processing on the basis of a plurality of data of the numbers of rotations stored in the memory circuit, and for example, controls the motor driver MDR on the basis of the data processing result. The central processing unit CPU is electrically connected to the HICs 80, 81 by a harness. The central processing unit CPU is connected to a power supply (PWR) 91, such as a battery, and is supplied with the operation power supply from the PWR 91. Also, the central processing unit CPU is configured to be electrically connected to other ECU 92 provided in the vehicle by a harness so as to be able to perform communication.

The motor driver MDR and the central processing unit CPU are further electrically connected to a seat motor & sensor 93 including the electric motor of the reclining mechanism, the electric motor of the lift mechanism, the electric motor of the tilt mechanism, the electric motor of the slide mechanism, various sensors, and the like. Although not illustrated in FIG. 1, the seat for vehicle 1 has the electric motor of the reclining mechanism, the electric motor of the lift mechanism, the electric motor of the tilt mechanism, the electric motor of the slide mechanism, and various sensors.

The switch 21 is the front-rear direction adjusting switch for manually adjusting the pushout amount in the front-rear direction of the motor 701, and the switch 22 is the up-down direction adjusting switch for manually adjusting the height in the up-down direction of the motor 69.

The switch 23 is an operation mode changing switch that controls whether or not the control system 100 is operated as the fatigue reduction system. The on state of the switch 23 indicates that the control system 100 is operated as the fatigue reduction system. On the other hand, the off state of the switch 23 allows the occupant to manually operate the posture changing mechanism 110 by using the switches 21, 22.

The switch 24 is a switch that changes the operation mode of the fatigue reduction system. A human being is configured of, from the head side, seven cervical spine bones, twelve thoracic spine bones, and five lumbar spine bones, and has a sacral spine and a coccygeal bone therebelow. The fatigue reduction operation of the fatigue reduction system can select a first posture changing mode (a first fatigue reduction mode) that sets the supporting position of the back face supporting mechanism 63 to the position of the lumbar spine portion and a C shape posture mode (a second posture changing mode, a second fatigue reduction mode) that sets the supporting position of the back face supporting mechanism 63 to the position of the thoracic spine portion. By the on state (a first state) and the off state (a second state) of the switch 24, the first posture changing mode and the C shape posture mode can be selected.

An LED 25 is configured of, for example, a plurality of light emitting diodes. The LED 25 is connected to the central processing unit CPU, and can display the operation mode of the control system 100 by a combination of lighting and non-lighting on the basis of a signal from the central processing unit CPU.

When the switch 23 is brought into the on state, the control system 100 starts a fatigue reduction program according to the fatigue reduction system to execute the program by the central processing unit CPU.

Next, the fatigue reduction system will be described. The fatigue reduction system sets the supporting position of the back face supporting mechanism 63. When by the on state of the switch 24, the first posture changing mode is designated as the operation mode of the fatigue reduction system, the central processing unit CPU sets the supporting position of the back face supporting mechanism 63 to the lumbar spine position. When by the off state of the switch 24, the C shape posture mode is designated as the operation mode of the fatigue reduction system, the central processing unit CPU sets the supporting position of the back face supporting mechanism 63 to the thoracic spine position.

Figure 10:
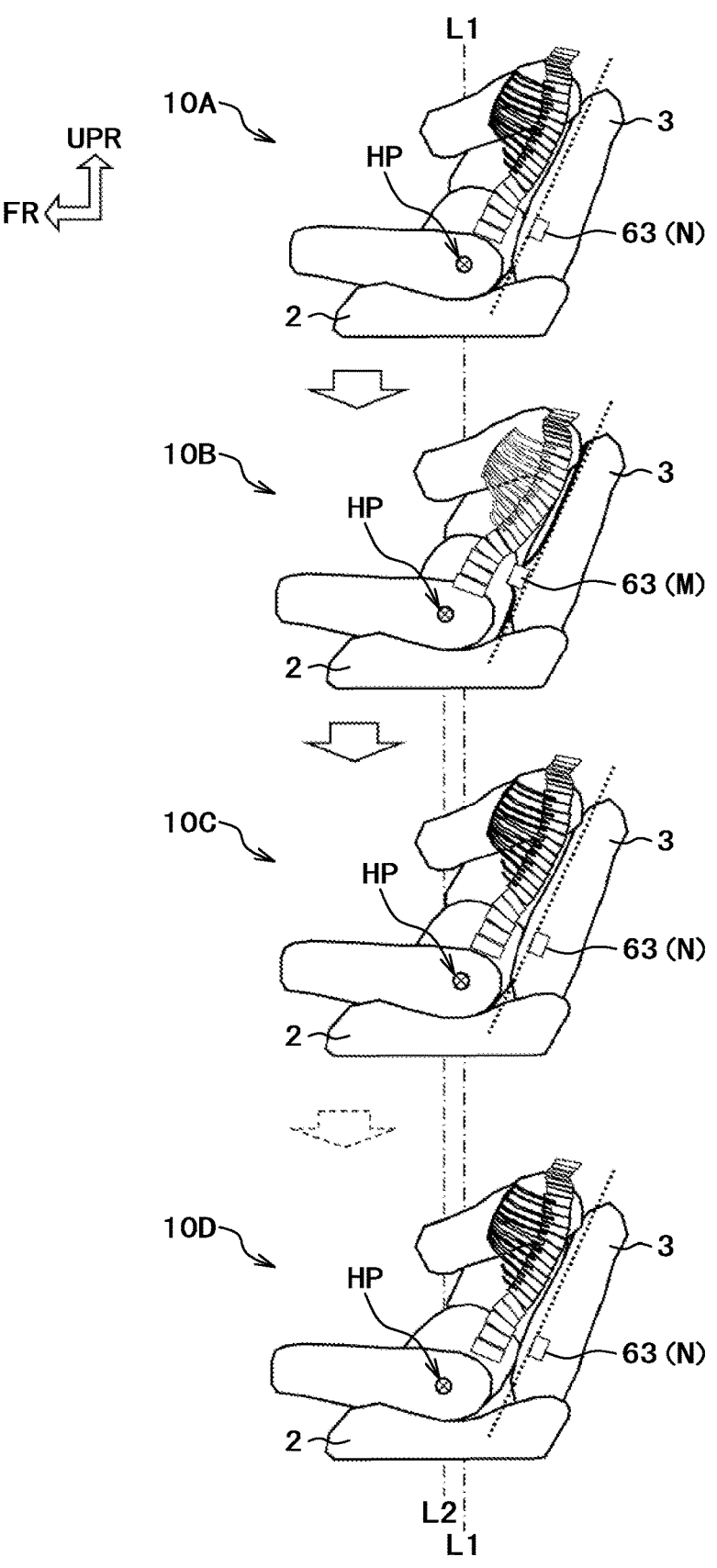
FIG. 10 is a diagram explaining the operation of an S shape posture mode according to a comparative example.

FIG. 10 is a diagram explaining the operation of an S shape posture mode according to a comparative example. FIG. 10 is a diagram when a state where the occupant sits on the seat cushion 2 and the seat back 3 coupled to the seat cushion 2 is seen from the side, and the back face supporting mechanism 63 of the posture changing mechanism 110 is in the lumbar spine position of the occupant. In the operation of the S shape posture mode according to the comparative example alternately changes the pushout amount of the back face supporting mechanism 63 to a reference position N (a neutral state: a state where the pushout amount is 0 mm, which is also referred to an N state) and a maximum position M of the pushout amount to the front FR side for each constant time (for example, 5 to 30 minutes). The S shape posture mode is a mode for changing the lumbar spine to the S shape.

FIG. 10 illustrates a first state 10A at the start of the operation, a second state 10B that is a state where the posture changing mechanism is ON, a third state 10C that is a state where the posture changing mechanism is OFF, and a fourth state 10D.

The first state 10A is the initial state of the operation of the S shape posture mode, the back face supporting mechanism 63 is disposed in the lumbar spine position, and the pushout amount of the back face supporting mechanism 63 is in the reference position N of 0 mm. A hip point HP of the occupant is on a line L1.

The second state 10B is a state where the back face supporting mechanism 63 is moved or movable to the front FR side without being stopped, and is a state where the pushout amount of the back face supporting mechanism 63 is caused to be the maximum position M (+M) and the lumbar spine is pushed by the back face supporting mechanism 63 and is changed to the S shape posture. Since the curving of the lumbar spine of the waist portion is limited, the hip portion moves in the front FR direction to the extent that the waist portion cannot be curved, and the hip point HP moves to the front FR side. The hip point HP is positioned to, for example, a line L2 disposed forward of the line L1. The state of the second state 10B is maintained for, for example, 15 minutes.

Thereafter, as illustrated in the third state 10C, the push-out amount of the back face supporting mechanism 63 is returned from the maximum position M to the reference position N. With this, the lumbar spine returns from the S shape posture illustrated in the second state 10B to the initial posture illustrated in the first state 10A. Although the hip portion also attempts to return to the original position, the hip portion does not completely return to the original position (the position illustrated in the first state 10A), so that the hip point HP is in the position slightly forward of the line L1.

Here, the second state 10B and the third state 10C are repeated a plurality of number of times to reduce the fatigue of the occupant, but as illustrated in the fourth state 10D, the shift of the hip portion in the front direction gradually becomes larger, and the hip point HP is in the position slightly forward of the line L2.

In this way, it is found that when the supporting operation in the front-rear direction of the posture changing mechanism (the back face supporting mechanism 63) is repeated at the hip portion of the occupant, the forward shift of the hip portion of the occupant occurs on the seat cushion 2 even if the occupant wears the seat belt, and the forward shift gradually becomes larger. When the forward shift of the hip portion occurs, the fatigue accumulation reduction effect for the occupant may not sufficiently obtained.

FIG. 11 is a diagram explaining the operation of the first posture changing mode according to the example. FIG. 11 is a diagram when a state where the occupant sits on the seat cushion 2 and the seat back 3 coupled to the seat cushion 2 is seen from the side, and illustrates a state where the back face supporting mechanism 63 of the posture changing mechanism 110 is in the lumbar spine position of the occupant. FIG. 11 illustrates a first state 11A at the start of the operation, a second state 11B that is a state where the posture changing mechanism is ON, and a third state 11C that is a state where the posture changing mechanism is OFF.

The first state 11A is the initial state of the operation of the first posture changing mode, the back face supporting mechanism 63 is disposed in the lumbar spine position, and the pushout amount of the back face supporting mechanism 63 is the reference position N (a first position state) of 0 mm. The hip point HP of the occupant is on the line L1.

The second state 11B is a state where the back face supporting mechanism 63 is moved or retreated to the rear RR side opposite the front FR side without being stopped, the pushout amount of the back face supporting mechanism 63 is caused to be the maximum position M (−M: a second position state), and the lumbar spine curves to the rear RR side. Since the posture is changed in the direction in which the lumbar spine of the waist portion easily curves, the forward shift of the hip portion can be prevented. That is, the hip point HP of the occupant scarcely moves, and is on the line L1 (The position of the hip point HP is maintained without moving).

In the third state 11C, the back face supporting mechanism 63 of the seat back 3 is moved stepwise to the front FR side at time intervals by a constant amount. Here, the back face supporting mechanism 63 is moved stepwise from the maximum position M (−M: the second position state) of the pushout amount to the reference position N (the first position state) in which the pushout amount is 0 mm. In this way, the back face supporting mechanism 63 of the posture changing mechanism 110 is operated stepwise, so that the posture changing of the lumbar spine of the occupant is promoted without difficulty, and the forward shift of the hip portion can thus be prevented. That is, the hip point HP of the occupant scarcely moves, and is on the line L1 (The position of the hip point HP is maintained without moving).

With this, it is possible to provide the technique by which the posture changing can be given to the occupant while the forward shift of the hip portion is prevented. Since the posture changing can be given to the occupant, the fatigue of the occupant can be reduced.

Figure 12:
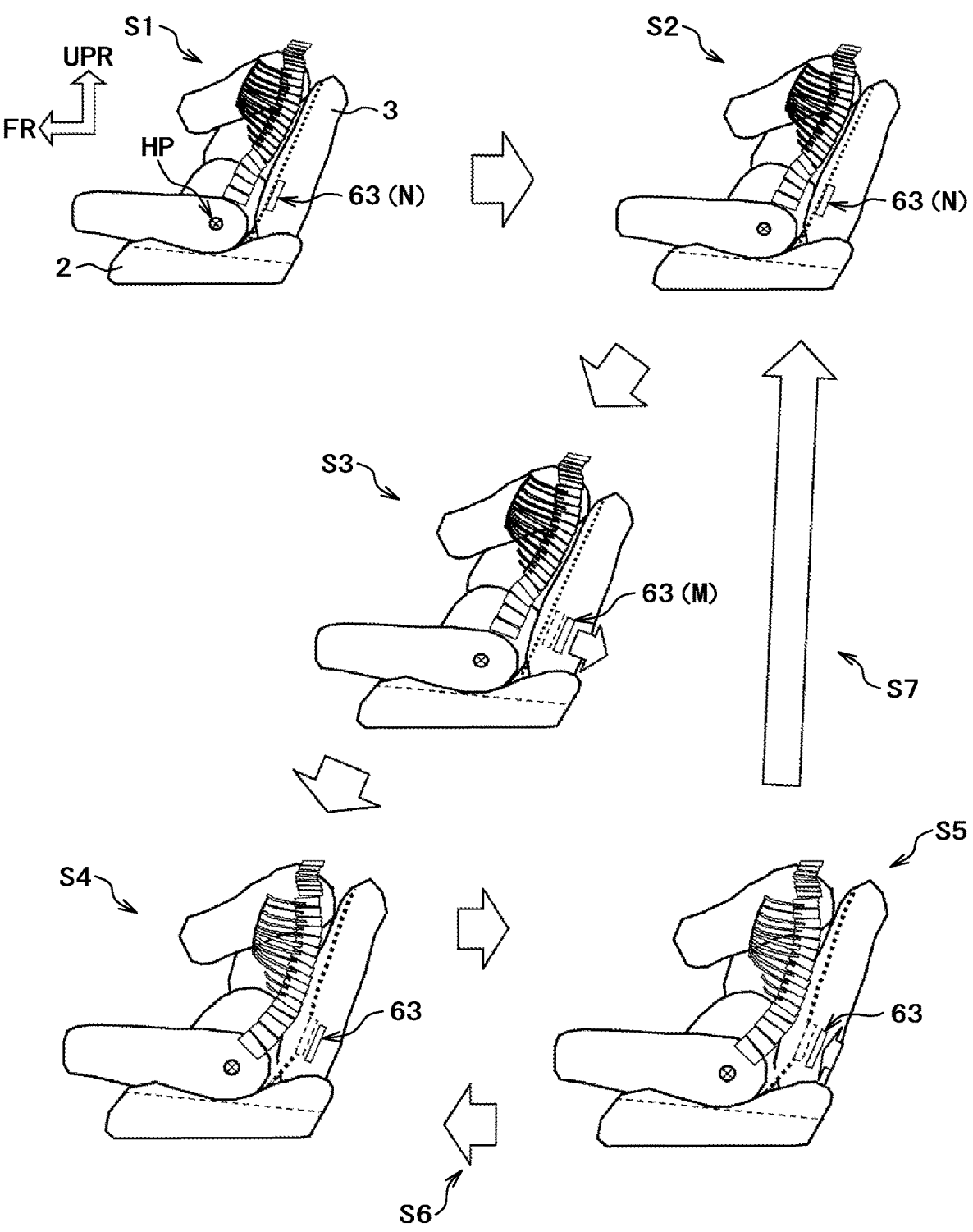
FIG. 12 is a diagram explaining the operation flow of the first posture changing mode of FIG. 11.

FIG. 12 is a diagram explaining the operation flow of the first posture changing mode of FIG. 11. FIG. 12 illustrates an operation when by the on state of the switch 24, the first posture changing mode is designated as the operation mode of the fatigue reduction system.

(Step S1: Start the System)

The fatigue reduction system is started by the control section 120. At this time, the back face supporting mechanism 63 of the posture changing mechanism 110 is disposed in the reference position N (the neutral state: the first position state) of a pushout amount D (=0 mm).

(Step S2: Wait for a Constant Time)

The back face supporting mechanism 63 of the posture changing mechanism 110 holds the neutral state for a constant time (15 to 30 minutes).

(Step S3: Retreat the Back Face Supporting Mechanism to the Rear Direction RR Side)

The back face supporting mechanism 63 of the posture changing mechanism 110 is operated, so that the back face supporting mechanism 63 is retreated to the rear direction RR side without being stopped. The pushout amount D of the back face supporting mechanism 63 is, for example, 10 mm or more, to the rear RR side (the second position state: D>−10 mm).

(Step S4: Wait for a Constant Time)

The state of the back face supporting mechanism 63 of the posture changing mechanism 110 is held for a constant time td in the state of step S3. Here, the constant time td is, for example, about 1 minute to 2 minutes.

(Step S5: Push Out the Back Face Supporting Mechanism 63 to the Front Direction FR Side by a Constant Amount d)

The back face supporting mechanism 63 of the posture changing mechanism 110 is operated, so that the back face supporting mechanism 63 is operated to be pushed out to the front direction FR side (the neutral state side) by the constant amount d. Here, the constant amount d is, for example, about 2 mm to 5 mm.

(Step S6: Repeat the Operation)

After step S5, step S4 and step S5 are repeated in this order until the back face supporting mechanism 63 of the posture changing mechanism 110 returns to the neutral state.

(Step S7: Continue the Operation Until the End of the System)

The operation in step S2 to step S6 is continuously executed until the end of the system. At the time of the end of the system, the control section 120 controls the position of the back face supporting mechanism 63 of the posture changing mechanism 110 to return the back face supporting mechanism 63 to the neutral state.

Figure 13:
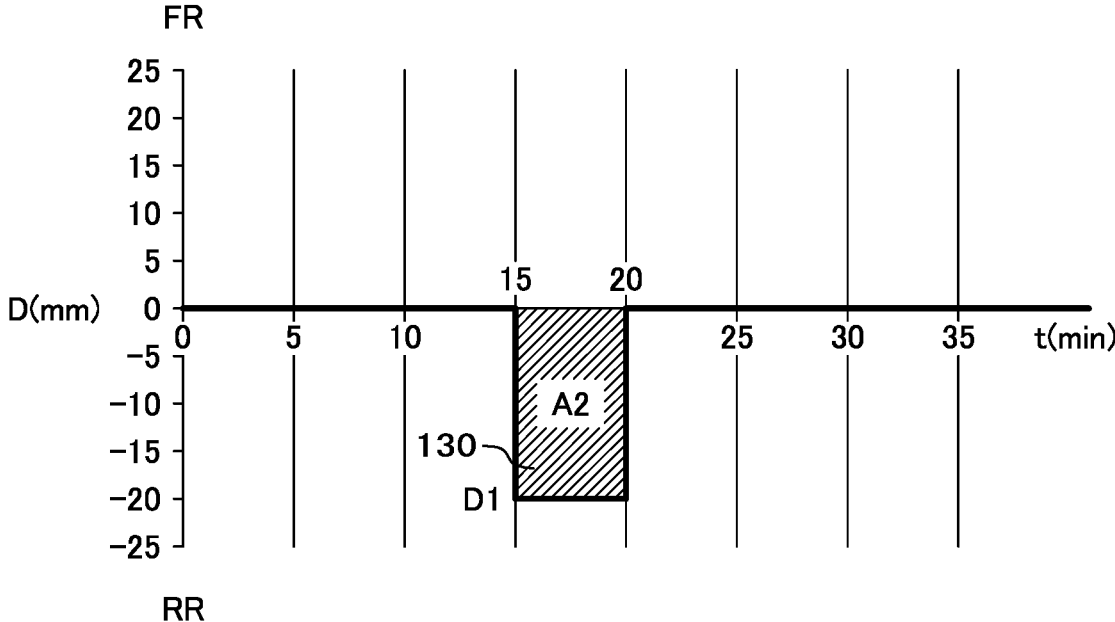
FIG. 13 is a diagram explaining the operation pattern of a second posture changing mode (a C shape posture mode)
Figure 14:
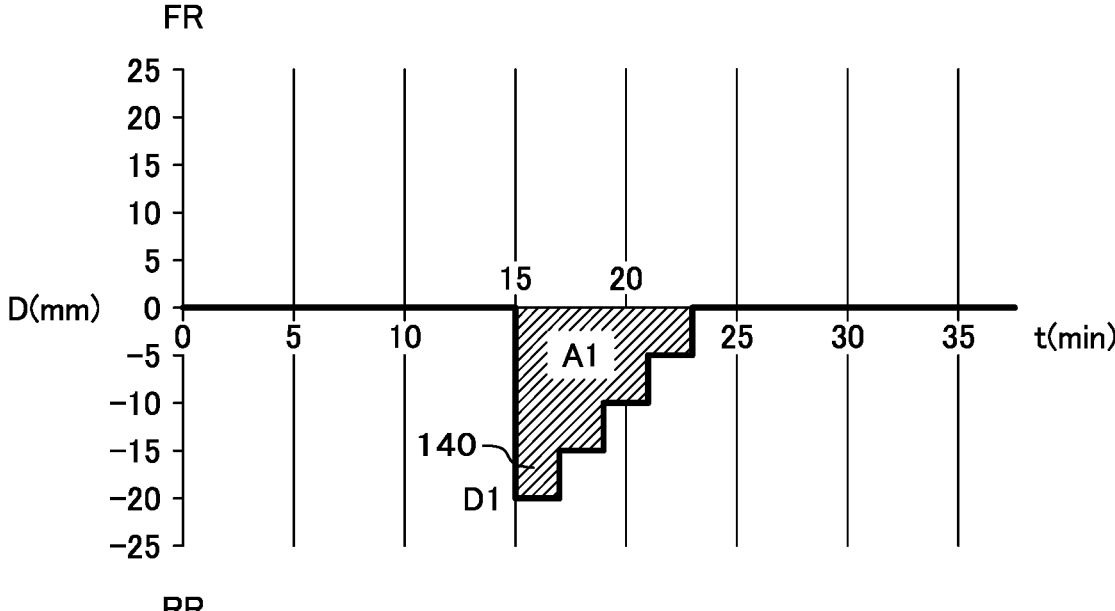
FIG. 14 is a diagram explaining the operation pattern of the first posture changing mode of FIG. 11.

Next, the operation pattern of the second posture changing mode and the first posture changing mode will be described with reference to FIGS. 13 and 14. FIG. 13 is a diagram explaining the operation pattern of the second posture changing mode (C shape posture mode). FIG. 14 is a diagram explaining the operation pattern of the first posture changing mode of FIG. 11. In FIGS. 13 and 14, the vertical axis indicates the pushout amount D (mm) as the operation amount of the back face supporting mechanism 63 of the posture changing mechanism 110, the + side is the front direction (FR), the − side is the rear direction (RR), 0 mm indicates the neutral state, and the horizontal axis indicates time t (min).

As illustrated in FIG. 13, in the operation pattern of the second posture changing mode (the C shape posture mode), the back face supporting mechanism 63 is set to the thoracic spine position, and the back face supporting mechanism 63 is moved to the rear direction RR side to the position where the pushout amount D that is the posture changing mechanism operation amount is D1=−20 mm. Thereafter, after the predetermined waiting time for 5 minutes that is between 15 minutes (m) to 20 minutes (m), the back face supporting mechanism 63 is moved to the front direction FR side to the neutral state. Here, a second value (the area of a diagonal line portion 130) calculated by the product of the predetermined waiting time (5 minutes) of the back face supporting mechanism 63 and the operation amount (20 mm) of the back face supporting mechanism 63 in the second posture changing mode is A2.

As illustrated in FIG. 14, in the operation pattern of the first posture changing mode, the back face supporting mechanism 63 is set to the lumbar spine position, and the back face supporting mechanism 63 is moved to the rear direction RR side to the position where the pushout amount D indicated by the posture changing mechanism operation amount is D1=−20 mm at the point in time of 15 minutes (min). In this state, the back face supporting mechanism 63 waits for the constant time td. Thereafter, the back face supporting mechanism 63 is operated so as to be pushed out to the front direction FR side (the neutral state side) by the constant amount d. Thereafter, in this state, the back face supporting mechanism 63 waits for the constant time td. Until the back face supporting mechanism 63 returns to the neural state (D=0 mm), the pushout operation of the back face supporting mechanism 63 to the front direction FR side (the neutral state side) by the constant amount d is repeated. In this example, the constant amount d is 5 mm, the constant time td is 2 minutes, and the number of times of repeats is 4.

Here, an area (a first value) A1 of a diagonal line portion 140 calculated by the product of the operation time (2, 2, 2, 2) of the back face supporting mechanism 63 and the operation amount (20 mm, 15 mm, 10 mm, 5 mm) of the back face supporting mechanism in the first posture changing mode is the same value as the area A2 of the diagonal line portion 130 (A1=A2). This is the setting for obtaining, in the first posture changing mode, the same fatigue reduction effect as the fatigue reduction effect in the second posture changing mode (the C shape posture mode).

In this example, for the area A1, the area A2 of FIG. 13 (5 (min)×20 (mm))=the area A1 of FIG. 14 (2 (min)×20 (mm)+2 (min)×15 (mm)+2 (min)×10 (mm)+2 (min)×5 (mm))=100.

The operation pattern of the first posture changing mode can be changed within the range satisfying all the following conditions.

1) To obtain the fatigue reduction effect, the area (integration value) of the diagonal line portion 140 is made to be the same as the area of the diagonal line portion 130.

2) Since the clear posture changing is required to be given for the fatigue reduction, the variable D1 (the posture changing mechanism operation amount: the pushout amount D of the back face supporting mechanism 63=the value of D1) is −10 mm or more. The value of the D1 is preferably in the range of 10 mm to 25 mm. In the example of FIG. 14, the variable D1 is −20 mm.

3) Since the C shape posture maintaining for a long time reduces the fatigue reduction effect, the variable T1 (the operation time during which the posture changing mechanism (the back face supporting mechanism 63) is operated) is "10 minutes or less". In the example of FIG. 14, the variable T1 is 23 minutes−15 minutes=8 minutes.

4) Since it is necessary to return the back face supporting mechanism 63 to the neutral state stepwise for preventing the forward shift of the hip portion, the variable td (the time to maintain the back face supporting mechanism 63: the constant time) is "1 minute or more". In the example of FIG. 14, the variable td is 8 minutes/4 times=2 minutes.

5) The moving speed from the supporting subtraction state of the back face supporting mechanism 63 (the pushout amount D1 of the back face supporting mechanism 63=−20 mm) to the neutral state (the pushout amount D of the back face supporting mechanism 63=0 mm) should be within the range of 1.5 mm/s to 3.5 mm/s. More specifically, the moving speed of the back face supporting mechanism 63 should be about 2.5 mm/s.

Figure 16:
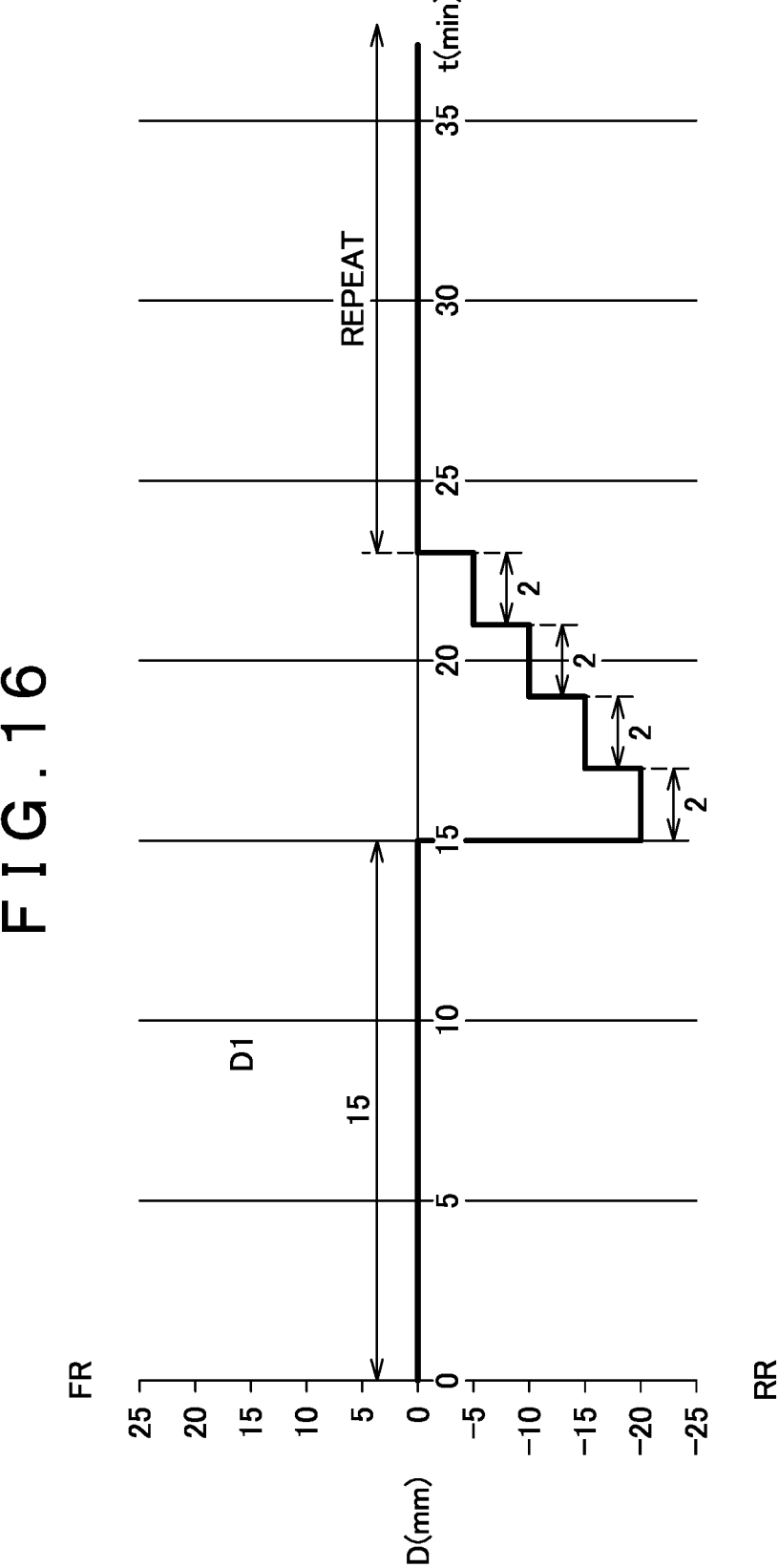
FIG. 16 is a diagram illustrating the operation pattern of the first posture changing mode of FIG. 11.

Next, examples of the operation flow and the operation pattern of the first posture changing mode will be described with reference to FIGS. 15 and 16. FIG. 15 is a diagram of the operation flow of the first posture changing mode according to the example. FIG. 16 is a diagram illustrating the operation pattern of the first posture changing mode corresponding to the operation flow of FIG. 15. Note that in FIG. 15, by the on state of the switch 24, the first posture changing mode is designated as the operation mode of the fatigue reduction system, and the supporting position of the back face supporting mechanism 63 is set to the lumbar spine position. The vertical axis and the horizontal axis of FIG. 16 are the same as FIGS. 13 and 14.

(Step S11)

The central processing unit CPU detects, by the seat motor & sensor 93, that the occupant sits on the seat for vehicle 1. With this, the fatigue reduction program is executed by the central processing unit CPU to start the fatigue reduction system. The fatigue reduction program detects the on state of the switch 24 to start the operation flow of the first posture changing mode. At the start of the operation of the first posture changing mode, the back face supporting mechanism 63 of the posture changing mechanism 110 is initially set to the neutral state (the pushout amount D=0 mm). Thereafter, the operation flow goes to step S12.

(Step S12)

The central processing unit CPU sets "0" to the flag provided in the fatigue reduction program. The flag is a flag for setting the number of times of repeats. In this example, as illustrated in FIG. 16, the number of times of repeats is 4. Thereafter, the operation flow goes to step S13.

(Step S13)

The central processing unit CPU maintains the state of the back face supporting mechanism 63 of the posture changing mechanism 110 for 15 minutes. As illustrated in FIG. 16, the back face supporting mechanism 63 maintains the neutral state (the pushout amount=0 mm) for 15 minutes. Thereafter, the operation flow goes to step S14.

(Step S14)

The central processing unit CPU controls the pushout amount adjusting motor 701 to drive the back face supporting mechanism 63 of the posture changing mechanism 110 in the rear direction RR by 20 mm (D1=−20 mm). As illustrated in FIG. 16, the back face supporting mechanism 63 is retreated in the rear direction RR from the neutral state (the pushout amount=0 mm) by the pushout amount (D1=−20 mm) without being stopped. Thereafter, the operation flow goes to step S15.

(Step S15)

The central processing unit CPU maintains the state of the back face supporting mechanism 63 of the posture changing mechanism 110 for 2 minutes (td=2, T1=8). As illustrated in FIG. 16, the back face supporting mechanism 63 maintains the state of the pushout amount (−20 mm) for 2 minutes. Thereafter, the operation flow goes to step S16.

(Step S16)

The central processing unit CPU adds "1" to the flag, and stores the resultant flag in the flag. With this, the flag is set to 1 (flag=1). Thereafter, the operation flow goes to step S17.

(Step S17)

The central processing unit CPU controls the pushout amount adjusting motor 701 on the basis of flag=1 to drive the back face supporting mechanism 63 of the posture changing mechanism 110 in the front direction FR by 5 mm. As illustrated in FIG. 16, when flag=1, the back face supporting mechanism 63 is moved in the front direction FR from the state of the pushout amount (−20 mm) by 5 mm, and is brought into the state of the position of the pushout amount (−15 mm). Thereafter, the operation flow goes to step S18.

(Step S18)

The central processing unit CPU determines whether or not the value of the flag is 4. When the value of the flag is not 4 (No), the operation flow goes to step S15, and step S15 to step S18 are repeatedly executed until the value of the flag becomes 4. As illustrated in FIG. 16, when flag=2, the back face supporting mechanism 63 is moved in the front direction FR from the state of the pushout amount (−15 mm) by 5 mm, and maintains the state of the position of the pushout amount (−10 mm) for 2 minutes. When flag=3, the back face supporting mechanism 63 is moved in the front direction FR from the state of the pushout amount (−10 mm) by 5 mm, and maintains the state of the position of the pushout amount (−5 mm) for 2 minutes. When flag=4, the back face supporting mechanism 63 is moved in the front direction FR from the state of the pushout amount (−5 mm) by 5 mm, and is brought into the state of the position of the pushout amount (0 mm).

When the value of the flag is 4 (Yes), the operation flow goes to step S19.

(Step S19)

The central processing unit CPU sets the flag from "4" to "0" (flag=0), and the operation flow goes to step S13. With this, step S13 to step S19 are repeatedly executed. For example, while the occupant drives the vehicle, the fatigue reduction system is continuously executed.

According to the example, the following effects can be obtained.

1) Since the posture changing can be given to the occupant while the forward shift of the hip portion is prevented, the fatigue of the occupant can be reduced.

2) The back face supporting mechanism 63 is used without installing the mechanism for preventing the forward shift of the hip portion in the seat cushion. With this, the forward shift of the hip portion can be prevented without increasing the number of components and the weight.

The invention made by the present inventors has been specifically described above on the basis of the example, but needless to say, the present invention is not limited to the embodiment and the example, and can be variously changed.

What is claimed is:

1. A seat for vehicle comprising:
a seat cushion; and
a seat back coupled to the seat cushion,
wherein the seat back includes a posture changing mechanism having a back face supporting mechanism,
wherein a fatigue reduction operation using the posture changing mechanism includes:
a) moving the back face supporting mechanism set to a position of a lumbar spine portion of an occupant from a first position state to a rear direction side and setting the back face supporting mechanism to a second position state; and
b) thereafter, moving the back face supporting mechanism stepwise to a front direction side from the second position state to the first position state, the stepwise movement including movement at time intervals at a constant amount,
wherein the first position state is a reference position at a pushout amount D (=0 mm) and the second position state is a maximum position M of the pushout amount, and
wherein the posture changing mechanism includes:
a first motor capable of moving a position in an up-down direction of the back face supporting mechanism;
a second motor capable of moving a position in a front-rear direction of the back face supporting mechanism; and
a control section that controls the first motor and the second motor,
the control section can set;
a first posture changing mode in which the a) and the b) are performed in such a manner that the position in the up-down direction of the back face supporting mechanism is set by the first motor so that the back face supporting mechanism is in the position of the lumbar spine portion of the occupant and the position in the front-rear direction of the back face supporting mechanism is changed by the second motor; and a second posture changing mode in which the position in the up-down direction of the back face supporting mechanism is set by the first motor so that the back face supporting mechanism is in a position of a thoracic spine portion of the occupant and the position in the front-rear direction of the back face supporting mechanism is changed by the second motor,
the second posture changing mode includes:
a1) moving the back face supporting mechanism from the first position state to the rear direction side and setting the back face supporting mechanism to the second position state; and
b1) after a predetermined waiting time a, moving the back face supporting mechanism from the second position state to the first position state, and
a first value calculated by a product of the operation time of the back face supporting mechanism and the operation amount of the back face supporting mechanism in the first posture changing mode and a second value calculated by a product of the predetermined waiting time of the back face supporting mechanism and the operation amount of the back face supporting mechanism in the second posture changing mode are the same value.

2. The seat for vehicle according to claim 1, wherein a distance between the first position state and the second position state is 10 mm to 25 mm.

3. The seat for vehicle according to claim 2, further comprising c) repeatedly executing the a) and the b).

4. The seat for vehicle according to claim 3, wherein in the b), the back face supporting mechanism is moved stepwise to the front direction side at constant time intervals by a constant amount from the second position state to the first position state.

5. The seat for vehicle according to claim 4, wherein the constant amount is 2 mm to 5 mm.

6. The seat for vehicle according to claim 5, wherein the constant time is 1 minute to 2 minutes.

7. The seat for vehicle according to claim 6, wherein operation time of the back face supporting mechanism in the a) and the b) is 10 minutes or less.

8. The seat for vehicle according to claim 1, wherein, in a), the back face supporting mechanism is moved from the first position state to the second position state without stopping.

* * * * *